United States Patent
La Forest et al.

(10) Patent No.: US 8,268,208 B2
(45) Date of Patent: *Sep. 18, 2012

(54) METHOD FOR REDUCING VARIABILITY IN CARBON-CARBON COMPOSITES

(75) Inventors: Mark L. La Forest, Granger, IN (US); Neil Murdie, Granger, IN (US); Allen H. Simpson, Buchanan, MI (US)

(73) Assignee: Honeywell International Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/171,786

(22) Filed: Jun. 29, 2011

(65) Prior Publication Data

US 2011/0254182 A1 Oct. 20, 2011

Related U.S. Application Data

(63) Continuation of application No. 12/027,120, filed on Feb. 6, 2008, now Pat. No. 7,998,376.

(51) Int. Cl.
*C01B 31/00* (2006.01)
(52) U.S. Cl. ..................................... 264/29.5
(58) Field of Classification Search .................. 264/29.5
See application file for complete search history.

(56) References Cited

U.S. PATENT DOCUMENTS

| | | | |
|---|---|---|---|
| 4,178,413 A | 12/1979 | DeMunda | |
| 5,061,414 A | 10/1991 | Engle | |
| 5,217,657 A | 6/1993 | Engle | |
| 5,398,784 A | 3/1995 | Haneda et al. | |
| 5,654,059 A | 8/1997 | Hecht | |
| 5,770,127 A | 6/1998 | Abrams et al. | |
| 5,837,081 A | 11/1998 | Ting et al. | |
| 6,077,464 A | 6/2000 | Murdie et al. | |
| 6,323,160 B1 | 11/2001 | Murdie et al. | |
| 6,325,608 B1 | 12/2001 | Shivakumar et al. | |
| 6,342,171 B1 | 1/2002 | Murdie et al. | |
| 6,537,470 B1 | 3/2003 | Wood et al. | |
| 6,699,427 B2 | 3/2004 | Huang et al. | |
| 6,939,490 B2 | 9/2005 | La Forest et al. | |

(Continued)

FOREIGN PATENT DOCUMENTS

EP 1 724 245 A1 11/2006

(Continued)

OTHER PUBLICATIONS

U.S. Appl. No. 12/036,881, titled "CVI Followed by Coal Tar Pitch Densification by VPI", filed Feb. 25, 2008.

(Continued)

*Primary Examiner* — Larry Thrower
(74) *Attorney, Agent, or Firm* — Shumaker & Sieffert, P.A.

(57) ABSTRACT

Method for producing carbon-carbon composite brake discs by: (a) providing annular nonwoven carbon fiber brake disc preforms; (b) carbonizing the brake disc preforms; (c) densifying the carbonized preforms by CVD/CVI (chemical vapor deposition/chemical vapor infiltration); (d) densifying the products of step (c) with isotropic or mesophase pitch by VPI (vacuum pitch infiltration) or RTM (resin transfer molding) processing; (e) carbonizing the preforms to remove non-carbon volatiles from the pitch and to open porosity in the pitch-infused preforms; (f) densifying the products of step (e) with isotropic or mesophase pitch by VPI or RTM processing; (g) carbonizing the preforms to remove non-carbon volatiles from pitch and to open porosity in the pitch-infused preforms; and (h) heat-treating the resulting pitch-densified carbon-carbon composite brake disc preforms. This manufacturing approach reduces lot-to-lot variability in friction performance of the resulting carbon-carbon composite brake discs.

17 Claims, 1 Drawing Sheet

U.S. PATENT DOCUMENTS

| | | |
|---|---|---|
| 7,063,870 B2 | 6/2006 | La Forest et al. |
| 7,172,408 B2 | 2/2007 | Wood et al. |
| 7,234,571 B2 | 6/2007 | Wood et al. |
| 7,252,499 B2 | 8/2007 | La Forest et al. |
| 7,927,523 B2 | 4/2011 | La Forest et al. |
| 2003/0111752 A1 | 6/2003 | Wood et al. |
| 2003/0214064 A1 | 11/2003 | Shin et al. |
| 2004/0017019 A1 | 1/2004 | Huang et al. |
| 2004/0105969 A1 | 6/2004 | Huang et al. |
| 2004/0155382 A1 | 8/2004 | Huang et al. |
| 2005/0093188 A1 | 5/2005 | Forest et al. |
| 2005/0266220 A1 | 12/2005 | La Forest et al. |
| 2005/0274581 A1 | 12/2005 | Huang et al. |
| 2006/0151912 A1 | 7/2006 | Bauer |
| 2006/0177663 A1 | 8/2006 | Simpson et al. |
| 2006/0197244 A1 | 9/2006 | Simpson et al. |
| 2006/0244165 A1 | 11/2006 | Huang |
| 2006/0261504 A1 | 11/2006 | Simpson et al. |
| 2006/0279012 A1 | 12/2006 | Simpson et al. |
| 2009/0194895 A1 | 8/2009 | La Forest et al. |
| 2011/0156297 A1 | 6/2011 | La Forest et al. |

FOREIGN PATENT DOCUMENTS

| | | |
|---|---|---|
| EP | 1 731 292 A2 | 12/2006 |
| WO | 9827023 A1 | 6/1998 |
| WO | 2002/018120 A2 | 3/2002 |
| WO | 2005/116476 A2 | 12/2005 |
| WO | 2005121592 A1 | 12/2005 |
| WO | 2006086167 A1 | 8/2006 |
| WO | 2006/115755 A2 | 11/2006 |

OTHER PUBLICATIONS

European Search Report from corresponding EP Application No. 09151681.5, mailed Jun. 25, 2009, 6 pages.

Oh et al., "Effects of Matrix Structure on Mechanical Properties of Carbon/Carbon Composites", Carbon, vol. 26, No. 6, pp. 769-776, 1988.

Pierson et al., "The Chemical Vapor Deposition of Carbon on Carbon Fibers," Carbon, 1973, vol. 13, pp. 159-166, Pergamon Press.

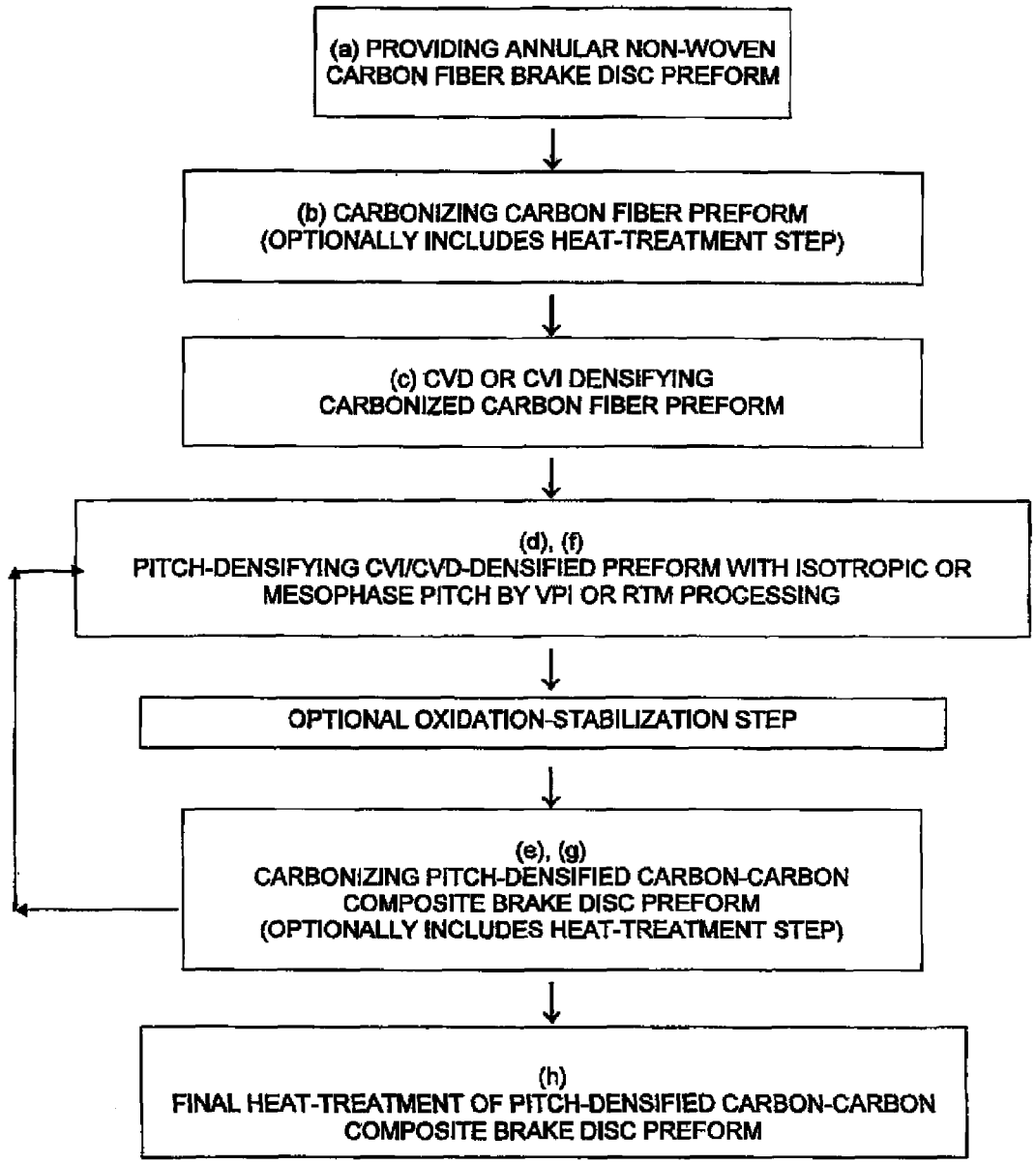

METHOD FOR REDUCING VARIABILITY IN CARBON-CARBON COMPOSITES

This application is a continuation of U.S. application Ser. No. 12/027,120, filed Feb. 6, 2008 and entitled, "METHOD FOR REDUCING VARIABILITY IN FRICTION PERFORMANCE," the entire content of which is incorporated by reference herein. U.S. application Ser. No. 12/027,120 published as U.S. Patent Application Publication No. 2009/0194895 on Aug. 6, 2009.

FIELD OF THE INVENTION

This invention relates to the manufacture of carbon-carbon composite brake discs suitable for use as components in the landing systems of large aircraft.

BACKGROUND OF THE INVENTION

Carbon-carbon composites are the material of choice for friction materials used in automotive and aerospace applications. One of the most important properties of brake discs in general, including brake discs that are suitable for use as components in the landing systems of large aircraft, is their friction and wear characteristics. While other factors, such as their weight, strength, durability and cost are also important, it is the friction and wear performance that controls the smooth performance and safety of the brakes on the aircraft. C—C composites provide good strength, friction performance, thermal properties and have the advantage of light weight over metallic friction materials.

To date, many different processing sequences have been developed to effect manufacture of carbon-carbon composite brake discs. CVI (chemical vapor infiltration) and CVD (chemical vapor deposition) are two essentially interchangeable processing techniques that are well known to persons skilled in the art of manufacturing carbon-carbon composites. Traditionally, carbon-carbon composites have been made by combining carbon fibers (PAN or pitch) with CVI/CVD and/or resin matrices. For purposes of convenience, this application will often refer to "CVD" alone. Persons skilled in the art will recognize that "CVI" processing could be used in place of any such disclosed CVD processing in the present invention.

Typically multiple cycles of CVI/CVD are required to fully densify the C—C composite to achieve a final density of >1.7 g/cc. Recently, pitch matrix C—C composites have also been used either alone or in combination with CVD/CVI and/or resin matrices for the manufacture of C—C Composites for braking applications. For instance, US 2006/0177663 A1 (Simpson et al.) discloses a carbon-carbon composite article such as a brake disc. Example 3 in this published application makes a preform from carbonized fibers which is infiltrated with coal tar pitch which is carbonized, followed by densification by resin transfer molding (RTM) processing (with high carbon yielding synthetic mesa pitch) and/or CVI/CVD processing, providing a preform having a density of 1.75 g/cc. U.S. Pat. No. 6,537,470 B1 (Wood et al.) discloses rapid densification of preforms using RTM. This patent teaches RTM densification of a CVD rigidized preform and optional additional treatments of the densified part, including carbonization and reimpregnation via RTM or CVD/CVI. Column 5, lines 1-6. EP 1 731 292 A2 (Simpson et al.) discloses carbon fiber preform densification by pitch infiltration followed by RTM and a single cycle of CVD.

While densification of C—C composites with high char-yield mesophase (synthetic, coal tar pitch, or petroleum derived) pitches and CVI/CVD provide good final properties and friction and wear performance the production costs of both processes are high. The capital costs of CVD are high, while the raw materials cost of and capital costs associated with densification processes using Resin Transfer Molding (RTM) with are high char yielding mesophase pitches are also high. While the use of low and medium char yielding isotropic pitches (synthetic, coal tar and petroleum derived) combined with Vacuum Pressure Impregnation (VPI) densification processes is attractive from a cost and capital expenditure aspect the resulting C—C composites suffer from high variation in resultant microstructures (optical texture) and the lack of ability to control the microstructure during processing. This lack of uniformity of pitch matrix microstructure leads to variation in the properties and friction and wear performance of the final composite.

Therefore, one of the problems with C—C composites made from isotropic low and medium char yield pitch matrices is related to the high lot-to-lot variability in the friction performance of carbon-carbon composite brake discs made by heretofore known methods.

SUMMARY OF THE INVENTION

The present invention provides a manufacturing process that utilizes low cost isotropic pitches and VPI processes combined with either CVD and/or RTM with isotropic (low and medium char yield) and/or mesophase (high char yield) pitches which provides composites with low and similar lot-to-lot variability in final properties and friction and wear performance as carbon-carbon composites manufactured from CVI/CVD.

The present invention provides a low cost manufacturing process with the same low variability in properties and friction and wear performance that is inherent in CVI/CVD and RTM processes utilizing mesophase (high char yield) pitches. This is achieved by manufacturing a carbon-carbon composite brake disc from a nonwoven carbon fiber preform that is first densified with CVD/CVI followed by densification with isotropic (low char or high char) and/or mesophase pitch (synthetic, petroleum, or coal tar pitch derived) by VPI and/or RTM processing, followed by heat treatment.

One embodiment of the present invention is a method for producing a carbon-carbon composite brake disc by way of the sequential steps (a) through (h) described hereinafter. Step (a) involves providing an annular nonwoven carbon fiber brake disc preform. Step (b) involves carbonizing the carbon fiber brake disc preform provided in step (a). Step (b) may be carried out, for instance, at a temperature between about 1400 and 2540° C. in an inert (nitrogen or vacuum) atmosphere. Step (c) includes densifying the resulting carbonized carbon fiber preform by chemical vapor deposition ("CVD") or chemical vapor infiltration ("CVI").

Step (d) includes densifying the product of step (c) with isotropic or mesophase pitch by vacuum pitch infiltration ("VPI") or resin transfer molding ("RTM") processing. In this step, for instance, the carbon-carbon composite brake disc preform may be densified with pitch to a density of approximately 1.3-1.6 grams per cubic centimeter by VPI processing. Where the VPI option is selected in step (d), the pitch used may be a low cost isotropic material (coal tar, petroleum, or synthetic). Where the RTM option is selected in step (d), the pitch used may be a high cost mesophase material (coal tar, petroleum, or synthetic). An optional oxidative stabilization step may, if desired, be carried out at a temperature between about 150 and 250° C. between steps (d) and (e), in order to prevent pitch exudation. Step (e) involves carbonizing the preform resulting from step (d) to remove non-carbon volatiles from the pitch and to open porosity in the pitch-infused preform. Carbonization step (e) may be carried out, for instance, at a temperature between about 1200 and 2000° C. in an inert (nitrogen or vacuum) atmosphere.

Step (f) includes densifying the product of step (e) with isotropic or mesophase pitch by VPI or RTM processing. In this step, for instance, the carbon-carbon composite brake disc preform may be densified with pitch to a density of approximately 1.75 grams per cubic centimeter by VPI processing. Where the VPI option is selected in step (f), the pitch used may be a low cost isotropic material (coal tar, petroleum, or synthetic). Where the RTM option is selected in step (f), the pitch used may be a high cost mesophase material (coal tar, petroleum, or synthetic). An optional oxidative stabilization step may, if desired, be carried out at a temperature between about 150 and 250° C. between steps (f) and (g), in order to prevent pitch exudation. Step (g) carbonizes that preform to remove non-carbon volatiles from pitch and to open porosity in the pitch-infused preform. Carbonization step (g) may be carried out, for instance, at a temperature between about 1200 and 2000° C. in an inert (nitrogen or vacuum) atmosphere.

Step (h) involves heat-treating the resulting pitch-densified carbon-carbon composite brake disc preform. Step (h) may be carried out, for instance, at a temperature between about 1400 and 2540° C. in an inert (nitrogen or vacuum) atmosphere. As persons skilled in the art will appreciate, pressure and a can may be used to prevent and contain pitch exudation during heat treatment instead of (or, if desired, in addition to) the optional oxidative stabilization steps mentioned above. Machining steps, applications of antioxidants, and other such conventional processing may be conducted after the steps listed above.

In accordance with this invention, the carbonized fiber preform produced in CVD densification step (c) may (but need not necessarily): (i.) have a rough laminar microstructure, due to having been densified with CVD to a density of about 1.4 grams per cubic centimeter; (ii.) have a smooth laminar microstructure, due to having been densified with CVD to a density of about 1.2 grams per cubic centimeter; or (iii.) have an isotropic microstructure, due to having been densified with CVD to a density of about 1.0 grams per cubic centimeter. The rough laminar microstructure may, for instance, be obtained by CVD densification at a temperature of 1275° C., a pressure of 210 Torr, and a C/H ratio of 1/4. The smooth laminar microstructure may, for instance, be obtained by CVD densification at a temperature of 1200° C., a pressure of 630 Torr, and a C/H ratio of 1/4. The isotropic microstructure may be obtained, for instance, by CVD densification at a temperature of 1425° C., a pressure of 630 Tort, and a C/H ratio of 1/4.

BRIEF DESCRIPTION OF THE DRAWING

FIG. 1 is a flowchart depicting steps in the process of the invention, including an optional heat treatment step.

DETAILED DESCRIPTION OF THE INVENTION

In carbon-carbon composites, it is the microstructure of the first cycle of carbon matrix material which is deposited immediately adjacent to the carbon fibers that most strongly influences the variability of mechanical and thermal properties as well as the friction and wear performance of articles such as brake discs made from the carbon-carbon composites. It has been observed that lot-to-lot variation of the microstructure (optical texture) in low-cost isotropic pitch-densified carbon-carbon composite materials is higher than observed for carbon-carbon composites densified by CVD or high-cost mesophase pitch with RTM processing.

The microstructure of the low-cost isotropic pitch matrix composites is controlled by the chemistry and impurities such as sulfur, silicon, and Iron for example that are typically inherent within the pitch feedstock. Variability in the chemistry of the pitch in turn influences the viscosity of the isotropic pitch during carbonization which produces a variety of different microtextures (optical textures). It is these different microstructures (optical textures) that results in lot to lot variation in final properties and friction and wear performance of the composites made from isotropic pitches.

In this invention, the first cycle of densification is performed with CVD. The CVD serves two purposes:

It rigidizes the preform for subsequent densification by isotropic and/or mesophase pitches by VPI and/or RTM. Densification of the fiber preform with mesophase pitch by RTM is difficult, since the high pressures required to inject the mesophase pitch into the preform tends to cause distortion of the fibers. However, there are instances where RTM densification is useful.

It provides a uniform carbon microstructure at all the fiber-matrix interfaces throughout the bulk of the composite. The microstructure of the CVD carbon can be easily controlled using standard processing parameters (temperature, pressure, flow rates, gas composition) to form the desired microstructure (rough laminar, smooth laminar, or isotropic) depending on the friction and wear performance requirements. This enables a uniform deposit of either rough laminar, smooth laminar, or isotropic carbon to deposited at all the carbon fiber interfaces. In this way, the variability of the carbon microstructure of the carbon matrix material adjacent to the carbon fiber is reduced and results in stable and consistent friction and wear performance.

Following CVD densification subsequent densification can be performed using either isotropic and/or mesophase pitch (coal tar, petroleum or synthetic derived) by either RTM or VPI processing. In its simplest and most economic form this invention comprises CVD densification of a carbon fiber preform followed by densification of a low-cost isotropic pitch (coal tar, petroleum, or synthetic derived) with vacuum pressure impregnation (VPI).

Pitch densification can be performed using either isotropic or mesophase pitches and VPI or RTM equipment. The overall economics of the process will depend on choice of pitch (isotropic vs. mesophase) with isotropic pitches significantly lower cost than mesophase the final density (number of pitch densifications cycles required) and the availability of existing equipment (VPI and/or RTM).

The use of a nonwoven fiber preform comprised of carbon (PAN—that is, polyacrylonitrile—or pitch) fibers is preferred to provide a composite with high strength. The carbon fiber preform is carbonized at 1200° C. to 2540° C.—preferably 1400° C. to 2000° C.—using either a one step heat-treatment process or a two step process (step 1: heating up to a final heat treatment of approximately 1600° C. followed by a second heat treatment up to 2000° C.).

The carbonized preform is then densified with CVD. The CVD provides a uniform carbon microstructure at the fiber matrix interface region and rigidizes the preform. The density of the rigidized preform is typically between 0.8-1.4 g/cc depending on the size of the preform and the type of CVD deposited. The microstructure of the CVD microstructure is controlled by the process variables (including temperature, pressure, gas composition) depending on the desired properties and friction and wear performance.

Following CVD the rigidized preform is densified with either a low cost isotropic pitch or mesophase pitch using VPI or RTM. Composites densified with isotropic pitch (coal tar, petroleum, or synthetic derived) are then carbonized to between 1200-1800° C. to form an anisotropic, graphitizable microstructure via the mesophase transition. Composites densified with mesophase pitch are carbonized to between 1200-1800° C. to form a graphitizable carbon.

Prior to carbonization an oxidation stabilization process may be required to prevent exudation of the pitch from the preform. Alternatively performs can be placed in cans and pressure can be applied to prevent and/or capture any pitch exudation, as described e.g. in U.S. Pat. No. 6,537,470 B1, the disclosure of which is incorporated herein by reference. Typically the density of the carbonized pitch densified composites is between 1.3-1.6 g/cc depending on the initial CVD rigidized preform, and the type of pitch used (isotropic low or high char yield or mesophase).

Following carbonization the composite is densified with either isotropic or mesophase pitch using VPI and or RTM. The lowest cost process will usually consist of using multiple cycles of isotropic pitch impregnations performed by VPI. However the use of mesophase pitch can be used to substitute for isotropic pitch by either VPI or RTM processing. At least one of the densification cycles would normally include use of an isotropic pitch using VPI processing.

The fully densified composite is then heat treated to between 1200-2540 C depending on the required final properties and friction and wear performance. The heat treated composite is then machined using standard grinders and an appropriate anti-oxidant is applied to prevent in-service oxidation.

A significant feature of the present invention is the variable economic scenarios it presents, which are achievable by selection between low cost isotropic pitch and high cost mesophase pitch on the one hand and by low cost VPI processing and high cost RTM processing on the other hand. Various scenarios are depicted in the Table that follows. The lowest cost option overall would involve the use of isotropic pitch and VPI processing in Densification Cycles 2 and 3.

| New Hybrid configuration | Densification Cycle 1 | Densification Cycle 2 Pitch/Process | Densification Cycle 3 Pitch/Process |
|---|---|---|---|
| 1. Low cost Isotropic pitch densification by VPI or RTM | CVD | Isotropic/VPI or RTM | Isotropic/ VPI or RTM |
| 2. Low Cost and High cost pitches by VPI or RTM | CVD | Isotropic/VPI or RTM | Mesophase/ VPI or RTM |
| 3. High cost pitches and low cost pitches by VPI or RTM | CVD | Mesophase/ VPI or RTM | Isotropic/ VPI or RTM |
| 4. High cost pitches by VPI or RTM | CVD | Mesophase by VPI or RTM | Mesophase by VPI or RTM |

EXAMPLES

Example 1

An annular carbon fiber brake disc preform is provided. The preform has an external diameter of 20 inches and an internal diameter of 8 inches. The preform is made up of segments of nonwoven polyacrylonitrile carbon fiber needled together in the annular shape. The nonwoven fiber preform is carbonized at 1600° C. in an inert nitrogen atmosphere. Subsequently, the carbonized preform is densified by chemical vapor deposition to a density of 1.3 grams per cubic centimeter. The resulting moderately dense preform is now densified with pitch by vacuum pitch infiltration processing to a density of 1.5 grams per cubic centimeter and then heat-treated at 1500° C. Next, the preform is densified by Resin Transfer Molding to a final high density of 1.75 grams per cubic centimeter. The basic manufacture process is completed by heat-treating the resulting pitch-densified carbon-carbon composite brake disc preform at a temperature of 1600° C. Before it is used in an aircraft landing system, the brake disc preform densified in this manner is machined to precise dimensions and coated with an anti-oxidant solution.

Example 2

An annular carbon fiber brake disc preform is provided. The preform has an external diameter of 20 inches and an internal diameter of 8 inches. The preform is made up of segments of nonwoven polyacrylonitrile carbon fiber needled together in the annular shape. The nonwoven fiber preform is carbonized at 1600° C. in an inert nitrogen atmosphere. Subsequently, the carbonized preform densified by chemical vapor deposition to a density of 1.1 grams per cubic centimeter. The resulting moderately dense preform is now densified with multiple cycles of pitch by vacuum infiltration to a final density of 1.75 grams per cubic centimeter. The basic manufacture process is completed by heat-treating the resulting pitch-densified carbon-carbon composite brake disc preform at a temperature of 2000° C. Before use in an aircraft landing system, the brake disc preform is machined to precise dimensions and coated with an anti-oxidant solution.

INDUSTRIAL APPLICABILITY

In terms of friction and wear performance, the first cycle of CVD provides a uniform microstructure at the fiber-matrix interfaces throughout the thickness of the composite. The subsequent pitch densification cycles provide an economical method to achieve a final density of >1.7 g/cc.

In terms of manufacturing economics, pitch matrix carbons obtained from Isotropic pitch feedstocks (coal tar, petroleum or synthetic) using VPI are less costly and the capital equipment costs are lower compared with standard CVD and RTM processes using mesophase pitches. Therefore, the hybrid composite concept embodied in the present invention enables the use of low cost pitch materials, combined with low cost capitalization for processing equipment that produces carbon friction materials with consistent properties and friction and wear performance.

What is claimed is:

1. A method comprising the sequential steps of:
   (a) carbonizing an annular nonwoven carbon fiber brake disc preform;
   (b) carrying out a first densification of the carbonized carbon fiber preform by chemical vapor deposition ("CVD") or chemical vapor infiltration ("CVI") to produce a carbonized fiber preform: (i.) having a rough laminar microstructure and a density of about 1.4 grams per cubic centimeter; (ii.) having a smooth laminar microstructure and a density of about 1.2 grams per cubic centimeter; or (iii.) having an isotropic microstructure and a density of about 1.0 gram per cubic centimeter;

(c) densifying a product of step (b) with pitch by vacuum pitch infiltration or resin transfer molding processing;
(d) carbonizing the preform at a temperature between about 1200° C. and 2000° C. in an inert atmosphere to remove non-carbon volatiles from the pitch and to open porosity in the pitch-infused preform;
(e) densifying a product of step (d) with pitch by vacuum pitch infiltration or resin transfer molding processing;
(f) carbonizing the preform at a temperature between about 1200° C. and 2000° C. in an inert atmosphere to remove non-carbon volatiles from the pitch and to open porosity in the pitch-infused preform; and
(g) heat treating a resulting pitch-densified carbon-carbon composite brake disc preform.

2. The method of claim 1, wherein carbonizing the annular nonwoven carbon fiber brake disc preform comprises carbonizing the annular nonwoven carbon fiber brake disc preform at a temperature between about 1400° C. and 2540° C. in an inert atmosphere.

3. The method of claim 1, wherein the carbonized carbon fiber preform is densified in step (b) by CVD densification at a temperature of 1275° C., a pressure of 210 Torr, and a C/H ratio of 1/4 to obtain the carbonized fiber preform having a rough laminar microstructure and a density of 1.4 grams per cubic centimeter.

4. The method of claim 1, wherein the carbonized carbon fiber preform is densified in step (b) by CVD densification at a temperature of 1200° C., a pressure of 630 Torr, and a C/H ratio of 1/4 to produce a carbonized fiber preform having a smooth laminar microstructure and a density of 1.2 grams per cubic centimeter.

5. The method of claim 1, wherein the carbonized carbon fiber preform is densified in step (b) by CVD densification at a temperature of 1425° C., a pressure of 630 Torr, and a C/H ratio of 1/4 to produce a carbonized fiber preform having an isotropic microstructure and a density of 1.0 grams per cubic centimeter.

6. The method of claim 1, wherein the pitch comprises an isotropic pitch.

7. The method of claim 1, wherein the pitch comprises a mesophase pitch.

8. The method of claim 1, wherein densifying the product of step (b) with pitch comprises densifying the product of step (b) by vacuum pitch infiltration processing to a density of approximately 1.3-1.6 grams per cubic centimeter.

9. The method of claim 1, wherein densifying the product of step (b) with pitch comprises densifying the product of step (b) by resin transfer molding processing to a density of approximately 1.3-1.6 grams per cubic centimeter.

10. The method of claim 1, wherein densifying the product of step (d) with pitch comprises densifying the product of step (d) by vacuum pitch infiltration processing to a density of approximately 1.75 grams per cubic centimeter.

11. The method of claim 1, wherein densifying the product of step (d) with pitch comprises densifying the product of step (d) by resin transfer molding processing to a density of approximately 1.75 grams per cubic centimeter.

12. The method of claim 1, wherein the inert atmosphere comprises at least one of a nitrogen or vacuum atmosphere.

13. The method of claim 1, further comprising performing an oxidative stabilization step at a temperature between about 150° C. and 250° C., at least one of between steps (c) and (d) or between steps (e) and (f), to prevent pitch exudation.

14. The method of claim 1, wherein heat treating the resulting pitch-densified carbon-carbon composite brake disc preform comprises subjecting the resulting pitch-densified carbon-carbon composite brake disc preform to a heat-treatment step at a temperature between 1600° C. and 2000° C. in the inert atmosphere.

15. The method of claim 1, wherein heat treating the resulting pitch-densified carbon-carbon composite brake disc preform comprises subjecting the resulting pitch-densified carbon-carbon composite brake disc preform to a final heat treatment step at a temperature between 1200° C. and 2540° C. in an inert atmosphere.

16. The method of claim 1, wherein pressure and a can are used to prevent and contain any pitch exudation during heat treatment.

17. The method of claim 1, wherein carrying out the first densification of the carbonized carbon fiber preform by chemical vapor deposition ("CVD") or chemical vapor infiltration ("CVI") to produce the carbonized fiber preform reduces variability of the carbon microstructure of carbon matrix material adjacent to carbon fiber of the preform.

* * * * *